United States Patent
Gödeke et al.

(10) Patent No.: US 8,371,121 B2
(45) Date of Patent: Feb. 12, 2013

(54) TURBOCHARGER WITH AN ELECTRIC MOTOR

(75) Inventors: Holger Gödeke, Achstetten (DE);
Rudolf Löffler, Unteressendorf (DE);
Ralf Heber, Erbach-Ersingen (DE);
Thomas Bischof, Illerbeuren (DE);
Sandra Maier, Bad Wurzach (DE);
Oliver Kämpfer, Memmingen (DE)

(73) Assignees: Lindenmaier AG, Laupheim (DE);
SycoTec GmbH & Co. KG, Leutkirch im Allgau (DE)

( * ) Notice: Subject to any disclaimer, the term of this patent is extended or adjusted under 35 U.S.C. 154(b) by 454 days.

(21) Appl. No.: 11/781,644

(22) Filed: Jul. 23, 2007

(65) Prior Publication Data

US 2008/0289333 A1 Nov. 27, 2008

(30) Foreign Application Priority Data

May 24, 2007 (EP) .................................. 07 090 100

(51) Int. Cl.
*F02B 33/44* (2006.01)
*F04B 17/00* (2006.01)
*F04B 35/04* (2006.01)
(52) U.S. Cl. ...................... 60/607; 417/410.1; 417/423.1
(58) Field of Classification Search ................. 60/605.1, 60/607, 608, 289; 417/24, 379, 380, 381, 417/407, 410.1, 423.1
See application file for complete search history.

(56) References Cited

U.S. PATENT DOCUMENTS

| | | | | | |
|---|---|---|---|---|---|
| 4,485,310 | A | * | 11/1984 | de Valroger | 290/52 |
| 4,882,905 | A | * | 11/1989 | Kawamura | 60/608 |
| 4,901,530 | A | * | 2/1990 | Kawamura | 60/608 |
| 5,870,894 | A | * | 2/1999 | Woollenweber et al. | 60/607 |
| 5,904,471 | A | * | 5/1999 | Woollenweber et al. | 417/371 |
| 6,085,527 | A | * | 7/2000 | Woollenweber et al. | 60/607 |
| 6,169,332 | B1 | * | 1/2001 | Taylor et al. | 290/7 |
| 6,457,311 | B2 | * | 10/2002 | Fledersbacher et al. | 60/605.3 |
| 6,481,205 | B2 | * | 11/2002 | Fledersbacher et al. | 60/605.1 |
| 6,571,558 | B2 | * | 6/2003 | Finger et al. | 60/605.1 |
| 6,718,955 | B1 | * | 4/2004 | Knight | 123/559.1 |
| 6,735,945 | B1 | * | 5/2004 | Hall et al. | 60/608 |
| 6,739,845 | B2 | * | 5/2004 | Woollenweber | 417/407 |
| 6,865,888 | B2 | * | 3/2005 | Grundl et al. | 60/608 |
| 6,958,550 | B2 | * | 10/2005 | Gilbreth et al. | 290/52 |
| 7,025,579 | B2 | * | 4/2006 | Woollenweber et al. | 417/407 |
| 7,540,149 | B2 | * | 6/2009 | Sumser et al. | 60/605.1 |
| 2006/0123783 | A1 | * | 6/2006 | Philippe | 60/607 |
| 2007/0186551 | A1 | * | 8/2007 | Ante et al. | 60/605.1 |

* cited by examiner

*Primary Examiner* — Thomas Denion
*Assistant Examiner* — Cameron Setayesh
(74) *Attorney, Agent, or Firm* — Fay Kaplun & Marcin, LLP

(57) ABSTRACT

A turbocharger includes a turbine wheel, a compressor wheel connected thereto, an electric motor situated on the side of the compressor wheel which is distant to the turbine wheel, and a rotor connected to the compressor wheel in a rotationally fixed manner and designed in a freely projecting manner. A drive system for motor vehicles includes a turbocharger. The turbocharger is characterized by a very spontaneous response behavior, as well as the possibility for energy recovery.

25 Claims, 7 Drawing Sheets

[Perspective View - A]    Exploded View

[Perspective View - A]

[Perspective View - B]

[Perspective View - C]

Exploded View

TURBOCHARGER WITH AN ELECTRIC MOTOR

FIELD OF INVENTION

The present invention relates to a turbocharger, as well as to a drive system which contains such a turbocharger.

BACKGROUND INFORMATION

Internal combustion engines with turbochargers are basically known in the motor vehicle sector. Typically, an exhaust gas flow out of the combustion engine is used to drive a turbine wheel. This turbine wheel is for example coupled via a shaft to a compressor wheel which ensures a compression of supplied fresh air in the combustion space. Such a precompression or "charging" leads to an increased engine power or increased torque compared to conventional internal combustion engines. However, with internal combustion engines charged in such a manner, there exists the problem of the so-called "turbolag", which in particular occurs on running up and accelerating from low rotational speeds of the vehicle, thus when the internal combustion engine is to be rapidly accelerated into regions of increased power. This is due to the fact that the increased air quantity requirement on the air feed side may only be provided with some delay (amongst other things caused by the inertia of the system of the turbine wheel and compressor wheel).

SUMMARY OF INVENTION

The present invention relates to a turbocharger which supplies precisely the correct quantity of fresh air with the smallest possible delay, and which furthermore is simple in its construction and is susceptible to trouble as little as possible.

The turbocharger according to the present invention contains a turbine wheel as well as a compressor wheel connected thereto, wherein an electric motor is provided on the side of the compressor wheel which is distant to the turbine wheel, and a rotor of the electric motor which is connected to the compressor wheel in a rotationally fixed manner, is designed in a freely projecting manner.

Given an increased fresh air demand (e.g. ascertained by control electronics), the electric motor serves for an additional acceleration of the compressor wheel by the electric motor. Electric motors are favourable for this, since these may be accelerated with a large torque without a noticeable run-up delay.

It is further advantageous that the electric motor in the present case is not arranged between the turbine wheel and the compressor wheel. Such an arrangement would lead to thermal problems and represents a large design modification of conventional (purely mechanical) turbochargers. Apart from the increased design effort, the repair effort with such constructions is considerable.

It is therefore advantageous that a sequence "turbine wheel, shaft (mounting), compressor wheel, electric motor" seen in the axial direction is given in the present case. Thus only the electric motor is subjected to the temperature of the surroundings, so that a thermal decomposition of the stator winding etc. may not occur.

The particular advantage lies in the freely projecting end on the other side of the compressor wheel. The rotor of the electric motor is attached here. According to the invention, it is not necessary here to attach a further bearing location, in order to thus mount the rotor on both sides. Such a bearing location on the one hand, under certain circumstances, would upset the electrical characteristics of the electric motor and under certain conditions would represent a static redundancy. Furthermore, the friction work in the system is unnecessarily increased by way of such a bearing. Moreover, the supply of fresh air is also hindered by such a bearing, since suitable struts/members reduce the inlet air opening in size towards the compressor wheel.

Furthermore, the design difference to purely mechanical turbochargers is conceivably small with the "projecting" rotor, so that an electric motor may be supplemented on conventional turbochargers in this way, in a very inexpensive, modular and easily repairable manner.

The drive system according to the invention, apart from the inventive turbocharger, comprises an internal combustion engine. An "internal combustion engine" in the context of the present invention is to be understood as any motor which requires fresh air/fresh gas as well as produces exhaust gas, so that a suitable turbocharger may be applied here. Furthermore, the drive system also comprises a storage device for electrical energy. Here, preferably the electric motor of the turbocharger is connected to the storage device for electrical energy, for the removal of electrical energy in a motor operation of the turbocharger and for feeding electrical energy in a generator operation of the turbocharger.

In this manner, on the one hand excess "mechanical energy" may be extracted into electrical energy again, and the energy balance of the drive system is once again improved by way of this. As a whole therefore, a very good closed-loop control of the turbocharger results, since apart from acceleration of the compressor wheel or turbine wheel, a suitable "braking procedure" is also possible.

It is also particularly advantageous with this drive system, when the electric motor of the turbocharger or the electrical storage device connected to it, may be additionally connected to an electromotoric drive of a motor vehicle. This electromotoric drive may for example be a hub electric motor (or another electric motor provided in the drive train), which is fastened on a drive wheel of the motor vehicle. In this manner, an additional provision of torque or motor power is achieved on accelerating in modern so-called "hybrid vehicles", since apart form the internal combustion engine motor, it is also the electrical hub motors which are responsible for the acceleration. A braking effect and thus a recovery of kinetic energy into electrical energy may be achieved with braking procedures by way of the switch-over of the electrical hub motors into generator operation, and this electrical energy is intermediately stored in a suitable storage device. If the electric motor of the turbocharger is now connected to this storage device, then the complete electrical energy may be "managed" in a central manner, in order to be able to fall back on this at any time, in a useful manner.

Apart from this, it is of course also possible for the turbocharger system and the electrical hub motors (or other motors in the drive train) to have electrical storage devices which are independent of one another.

Preferably, one is to provide control electronics in the drive system for determining the rotational speed of the turbine wheel or compressor wheel, actual values of the pressure conditions on the turbine housing side and the compressor housing side, as well as further values which are of relevance with regard to the torque for the internal combustion engine, for the control of electrical energy or for the provision of an optimal torque with a low consumption.

Advantageous formations of the turbocharger according to the invention are described in the following advantageous further designs.

One advantageous further design envisages the turbine wheel and the compressor wheel being permanently connected to one another in a rotationally fixed manner. This means that no coupling between the turbine wheel and the compressor wheel is given, by which means the mechanical construction and the susceptibility to failure of the system would be increased. Instead of this, one strives to limit the moved rotational masses by way of a light rotor, a light compressor wheel, a light shaft and a suitably low-mass turbine wheel.

The housing of the turbocharger is preferably constructed in a modular manner, i.e. a compressor housing for the compressor wheel is given, apart from a turbine housing for the turbine wheel. The turbine housing is preferably connected to an exhaust fan which leads exhaust gas from the individual cylinders of the internal combustion engine, to the turbine wheel. The design demands are somewhat different than on the compressor housing which surrounds the compressor wheel, on account of the thermal loading of the turbine housing. The actual mounting of the turbine wheel and the compressor wheel preferably takes place exclusively between the turbine wheel and the compressor wheel. I.e. that no additional mounting is given on the side of the compressor wheel which is distant to the turbine wheel, since it is indeed here that the stator of the electric motor projects freely. Preferably, a bearing housing is provided between the turbine housing and the compressor housing, which serves for receiving bearing elements for the turbine wheel and the compressor wheel.

The electric motor preferably contains a stator which has an essentially hollow-cylindrical shape and which surrounds the rotor in a concentric manner. Here, it is advantageous that the stator may be designed as part of the inner wall of the compressor housing. The stator may for example also be applied as an insert into a corresponding opening of the compressor housing. The advantage with these embodiments is the fact that only an as small as possible design change of conventional mechanical turbochargers is necessary, so that cost- and competitive advantages may be realised by way of this, in particular with large-scale production.

The rotor of the electric motor preferably has a rotor magnet which is surrounded by a sheathing. The rotor magnet is mechanically protected by way of this. One may also have an influence on the type of magnetic field in this manner. The rotor magnet may be designed such that it is partly or completely integrated into the compressor wheel. If the compressor wheel consists of fibre-reinforced or non-reinforced plastic, then on production, the rotor magnet may be directly peripherally injected with the plastic mass, by which means an inexpensive large-scale manufacture is possible.

The sheathing of the rotor is preferably designed in a "cylinder-like" manner.

It is advantageous with regard to manufacturing technology, for the rotor magnet to be hollow in the inside in regions for placing on a common shaft with the compressor wheel. An inexpensive manufacture is possible in this manner.

The compressor wheel may also be of a non-metallic material, preferably of a reinforced or non-reinforced plastic. The electromagnetic field of the electric motor is practically no longer influenced by way of this.

One further advantageous design envisages the rotor gap between the rotor and the stator representing an inlet air opening for the compressor wheel. This in turn means that the electric motor hardly gets in the way of the air feed flow, and that no additional air feed openings need to be provided, which would unnecessarily increase the flow resistance. It is therefore even possible for the inlet opening to be free of struts between the rotor and stator. Here, such a provision of struts is not necessary due to the omission of the "counter bearing".

The inlet opening may be provided with a large cross-sectional area, depending on the dimensioning of the rotor or stator. Preferably, the smallest inner diameter of the stator is 1.5- to 8-times, preferably 2- to 4-times the size of the largest outer diameter of the rotor. The specified lengths here in each case relate to the greatest extensions or smallest extensions of the participating elements, but only in the region of the electrically or magnetically effective elements (thus only over the length of the rotor magnet for example) and a subsequent thickening (for example in the region of the compressor wheel) is not important here.

Here, the nominal voltage of the electric motor may be more than 12V, for example 24 or 48 V, for increasing the energetic efficiency.

It is particularly advantageous for the electric motor to be able to be switched over from motor operation into generator operation. If the charging pressure (in the turbine housing) reaches a certain nominal value, then additional energy is produced using a converter capable of a return feed. Furthermore, ideally one may do away with a waste-gate/pressure dose for blowing out excess exhaust gas pressure, by way of the energetic conversion of the braking energy.

The control of the motor/generator operation permits the targeted closed-loop control of the charging procedure. The rotor rotational speed, which, as a characteristic variable, is important for the closed-loop control, may be acquired with the help of a Hall-sensor, which is integrated in the motor, or via the motor control. Thus the combustion process of the piston motor may be therefore optimised. The control is preferably affected via the central motor management.

BRIEF DESCRIPTION OF DRAWINGS

The present invention is now explained by way of several figures. There are shown in:

FIG. 1d shows a part exploded drawing of the turbocharger of FIG. 1a;

FIG. 2b shows a view of the turbocharger shown in FIG. 2a;

DETAILED DESCRIPTION

The basics of the present invention are to be shown hereinafter by way of the first embodiment according to FIGS. 1a to 1d.

Figure 1A:
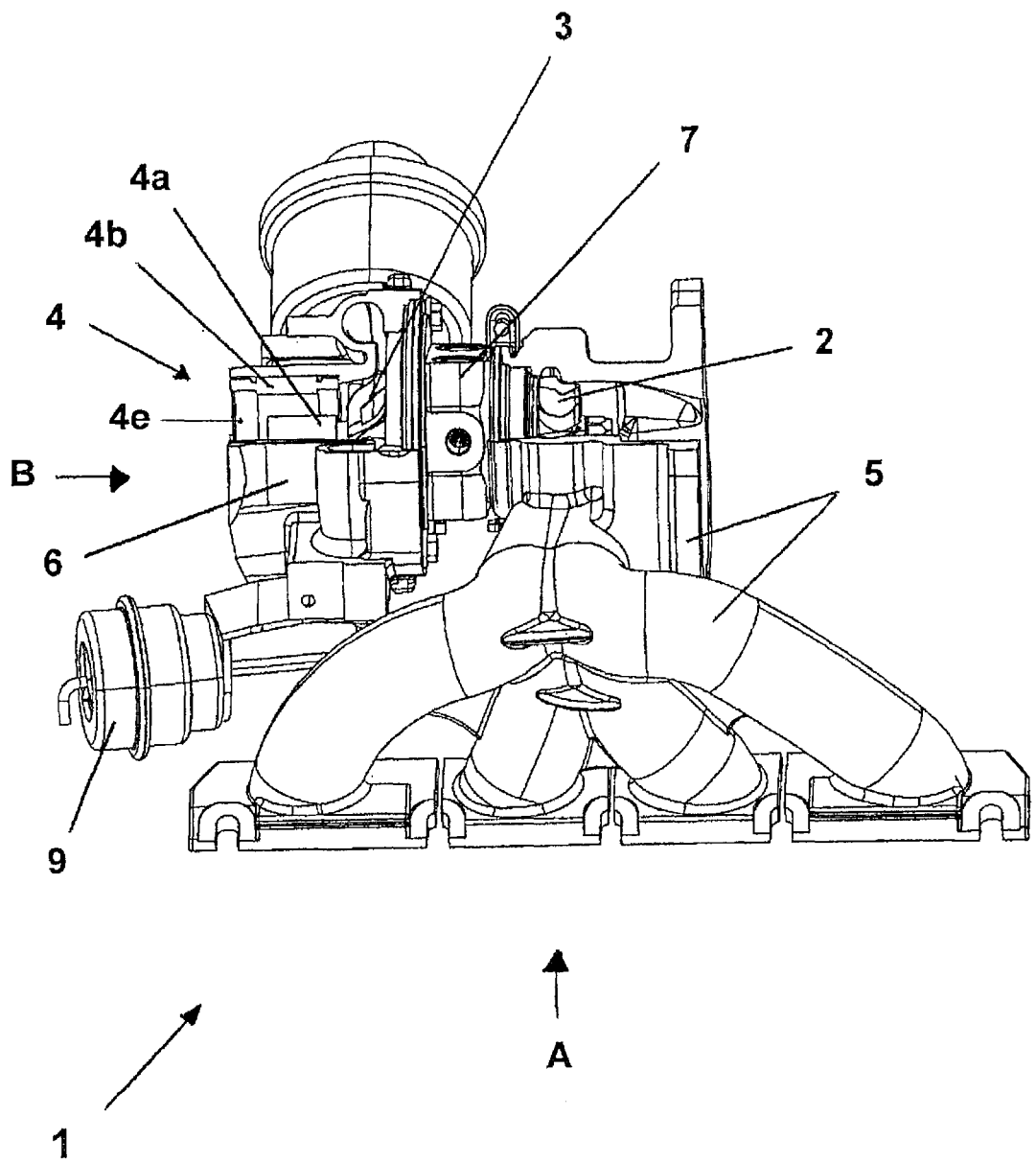
FIG. 1a shows a first exemplary embodiment of a turbocharger according to the present invention, in a part section.

FIGS. 1a to 1d show an electrically modified mechanical turbocharger 1 which may be coupled to a turbine housing 5 on an internal combustion engine. After the combustion, the exhaust gas is collected by way of the exhaust gas fans shown in FIG. 1a and is used for driving a turbine wheel 2. The turbine wheel 2 is surrounded by the turbine housing 5 and is essentially deduced from a conventional mechanical turbocharger. A bearing housing 7 connects to the turbine housing 5, and then a compressor housing 6. A compressor wheel 6 is attached in this compressor housing 6, and compresses the air fed through an inlet opening (this inlet opening is in particular easily seen in FIG. 1*c*) and leads it to the combustion space of the internal combustion engine in a manner which is not shown here. The compressor wheel 3 on the left side in FIG. 1*a* shows a continuation, to which a rotor 4*a* of an electric motor is given. The rotor 4*a* is attached centrally in the inlet air opening 4*e*.

A stator 4*b* which has an essentially hollow-cylindrical shape and is represented as part of the inner wall of the compressor housing in the region of the inlet air opening, is provided around the rotor 4*a*. Here, the stator 4*b* is even provided as an insert into a suitable opening, so that this may be assembled very easily. Here therefore in FIG. 1*a*, the rotor gap between the rotor 4*a* and the stator 4*b* is the inlet air opening 4*e* for the compressor wheel. With this, the inlet air opening 4*e* is free of struts between the rotor and the stator also according to FIG. 1*a*. The smallest inner diameter of the stator (see "$d_S$" in FIG. 1*d*) is 1.5 times larger than the largest outer diameter $d_R$ of the rotor.

Figure 1B:
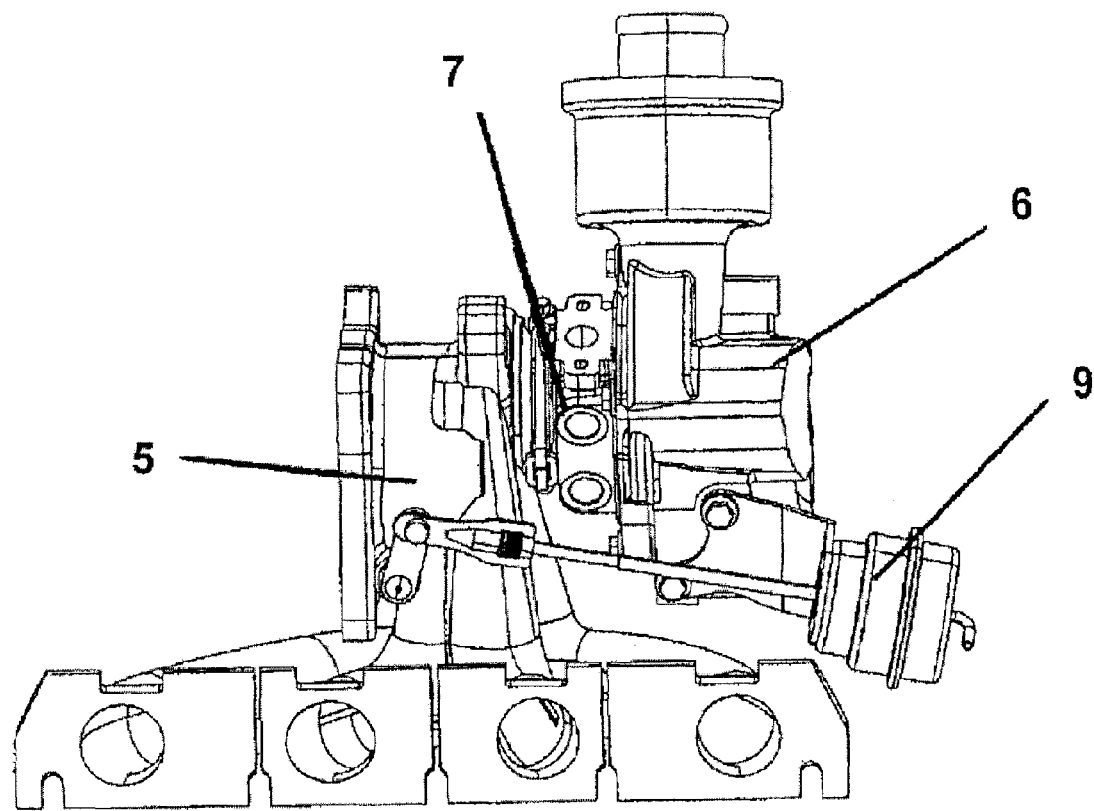
FIG. 1b shows a section of the turbocharger from FIG. 1a, according to A.
Figure 1C:
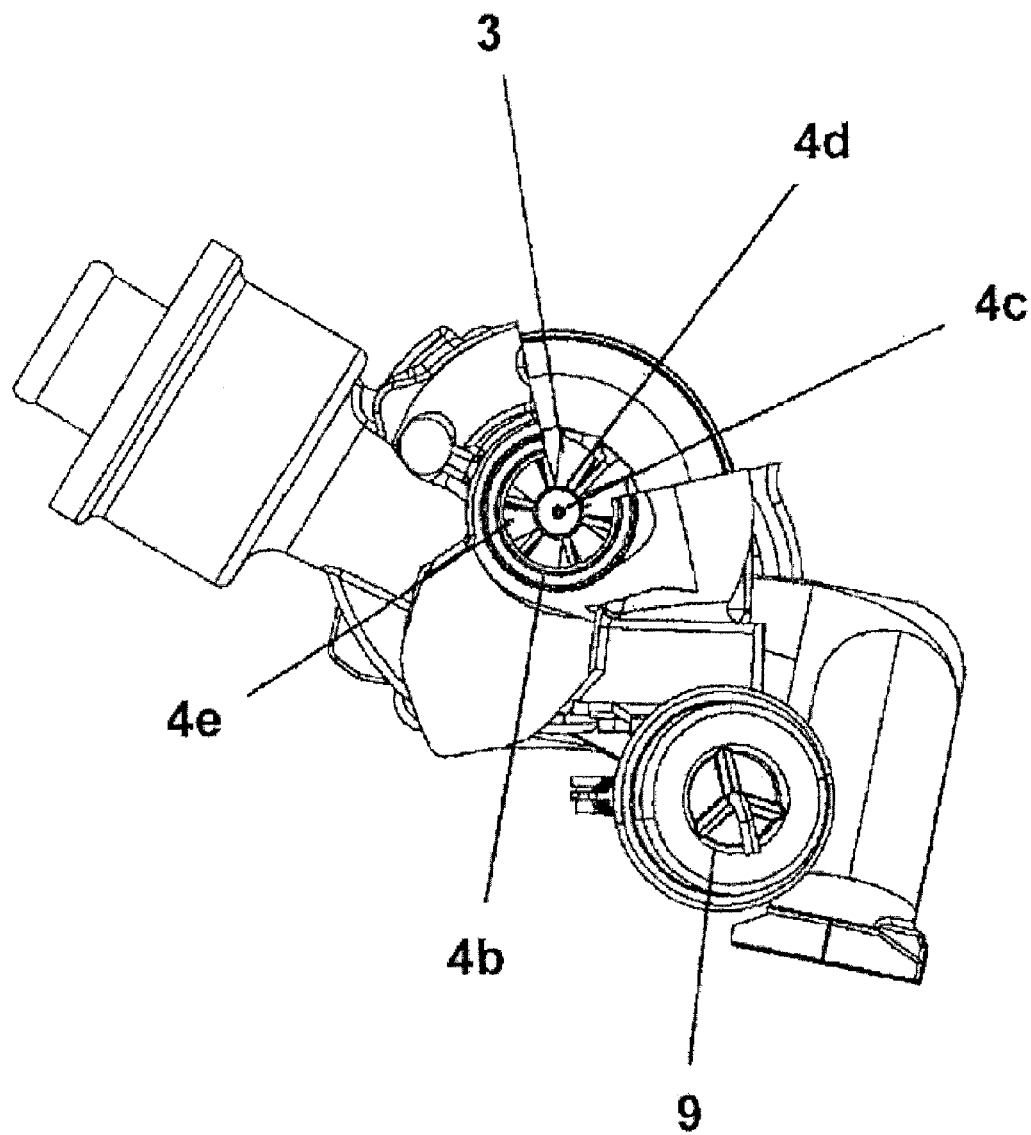
FIG. 1c shows a section of the turbocharger of FIG. 1a, according to B.
Figure 1D:
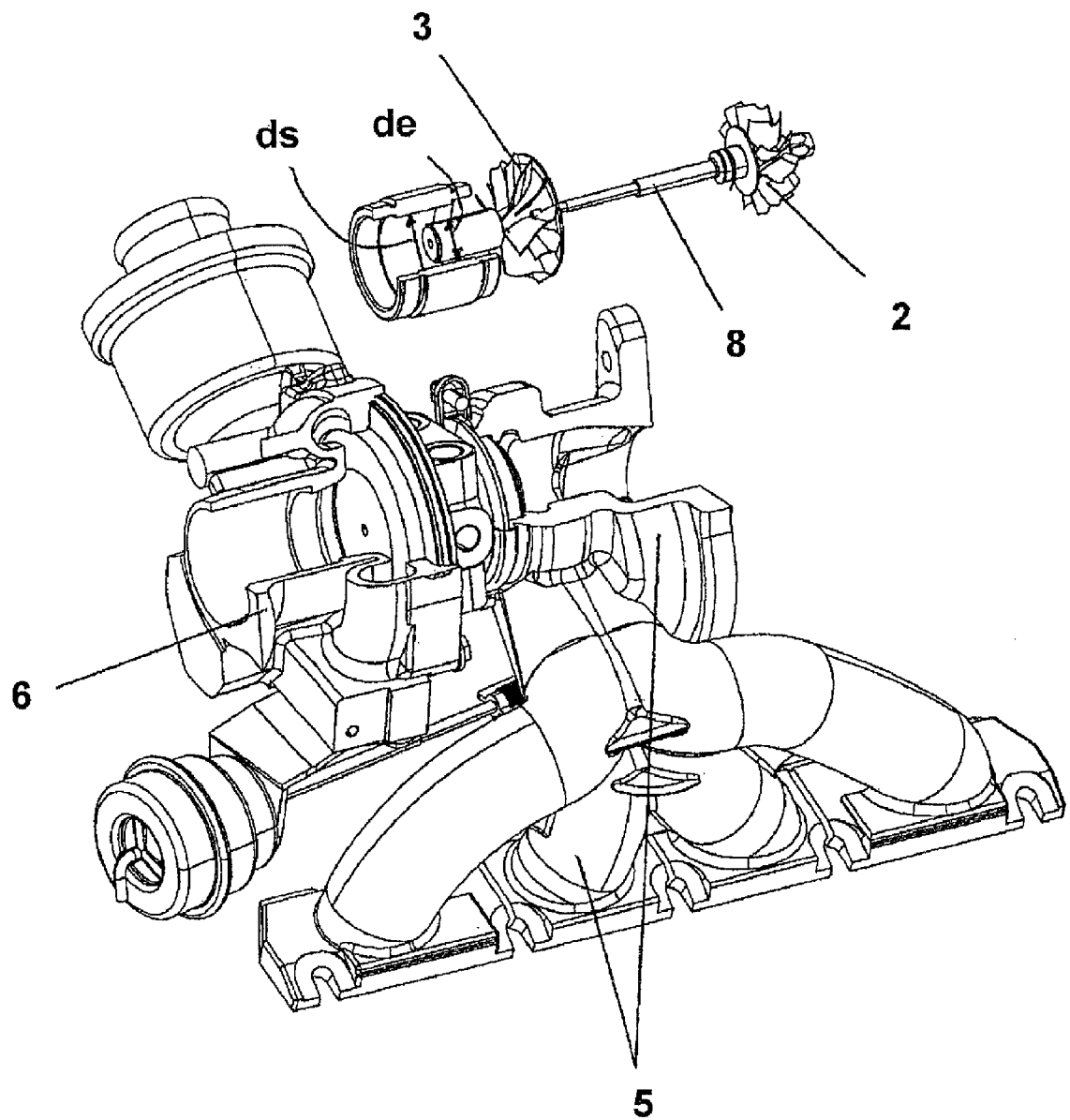

The rotor 4*a* of the electric motor 4 comprises a rotor magnet 4*c* which here is surrounded by an sheathing (see e.g. FIG. 1*d*). With this, the sheathing is designed in an essentially "beaker-shaped" manner, wherein the base of the beaker is almost completely closed towards the compressor wheel (disregarding a centric assembly bore).

The compressor wheel may (but need not) be of a non-metallic material, here with one embodiment, for example of a non-reinforced plastic, and the influence on the electromagnetic field of the electric motor is minimised. The rotor magnet 4*c* in turn is hollow in regions for placing on a common shaft with the compressor wheel. Here, a bore 4*c* of the rotor magnet is to be accordingly seen in FIG. 1*d*. Furthermore, it may be seen that a sequence of elements is shown in the sequence of the rotor (consisting of the rotor magnet 4*c* and sheathing 4*d*), the compressor wheel 3, shaft 8, turbine wheel 2, which minimises a thermal loading of the electric motor. The shaft 8 here in the present embodiment is designed such that the turbine wheel 2, compressor wheel 3 as well as rotor 4*a* are firmly (rotationally fixedly) connected to one another, thus may not be separated by a rotation clutch or free-wheel.

However, it is basically possible to provide such a clutch within the framework of the present invention, if it is the case for example that the turbine wheel 2 is very high, but however the design effort would in turn also be increased by way of this.

The nominal voltage of the electric motor 4 in FIG. 1*a* here is 12V, but other voltages (for example 48V for hybrid vehicles) are also possible.

The electric motor may be operated in motor operation (for accelerating and avoiding a "turbolag"), as well as in generator operation (for recovering energy). If the charging pressure (in the turbine housing) reaches a certain nominal value, then additional energy is produced by way of using a converter capable of return feed. Ideally, one may do away with a wastegate/pressure dose for blowing out excess exhaust gas pressure, as is represented in FIG. 1*b*, numeral 9, by way of this energetic conversion of the braking energy in generator operation.

The turbocharger according to the invention is used in a drive system according to the invention for motor vehicles which contains an internal combustion engine connected to the turbocharger, as well as a storage device for electrical energy. The electric motor of the turbocharger 1 here is connected to the storage device for electric energy for taking electrical energy in a motor operation of the turbocharger 1, and for feeding in electrical energy in a generator operation of the turbocharger. In a particularly preferred embodiment, the electric motor of the turbocharger is connected to an electrical storage device, wherein this electrical storage device is additionally connectable to an electromotoric drive of a motor vehicle. This may be a "hub motor" of a motor vehicle or another electric motor, which is provided in the drive train of a motor vehicle (for example in the region of the gear). This connection of the electrical turbocharger to a hybrid vehicle is particularly energy efficient.

Control electronics for determining the rotational speed of the turbine wheel 2 or the compressor wheel 3, actual values of pressure conditions on the turbine housing side and compressor housing side, as well as further values relevant to the torque for the internal combustion engine are provided for the efficient control of the drive system or the turbocharger.

The most important components of the first embodiment according to FIGS. 1*a* to 1*d* are shown in FIG. 1*d*, at the top right as a part exploded drawing. Here, it is to be seen that it is the case of a turbocharger 1 which comprises a turbine wheel 2 as well as a compressor wheel 3 connected thereto, wherein an electric motor 4 is provided on the side of the compressor wheel which is distant to the turbine wheel consisting of rotor 4*a* and stator 4*b*, and a rotor 4*a* of the electric motor 4 which is connected to the compressor wheel 3 in a rotationally fixed manner is designed in a freely projecting manner.

This "freely projecting" manner is advantageous, since the design effort is reduced by way of this and for example a static overdimensioning of the total mounting is avoided. "Freely projecting" is to be understood as those arrangements with which the rotor is not mounted in a separate and permanent manner. Possibly provided "support cages" etc., which are to prevent a bending of the freely projection rotor which may be too large, for example on account of bending resonance, are not to be seen in the context of "bearings".

Figure 2B:
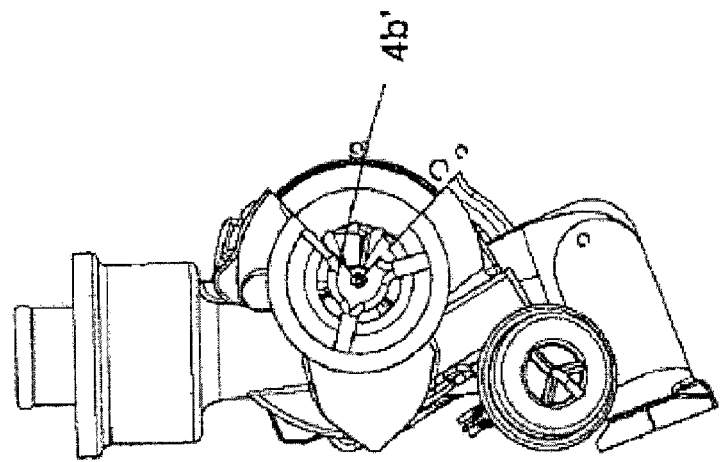
Figure 2A:
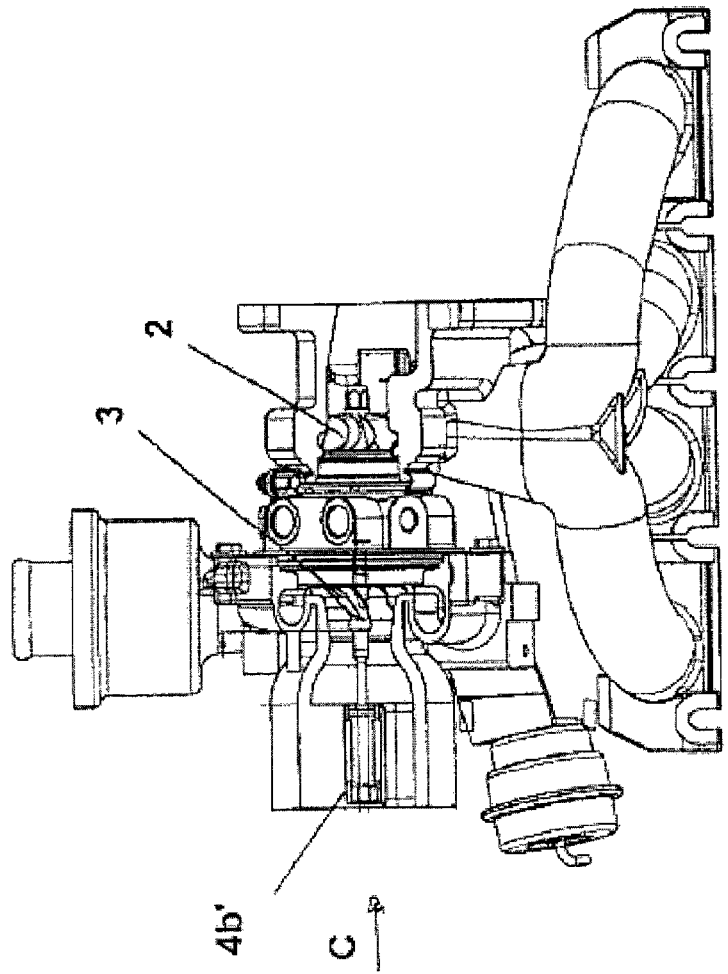
FIG. 2a shows a second exemplary embodiment of a turbocharger according to the present invention, in a part section.

FIGS. 2*a* and 2*b* show a second embodiment of the invention. Here, the stator is represented in a somewhat different manner, specifically in the direct vicinity of the rotor (with a relatively small rotor gap), and the inlet air opening to the turbine wheel 3 runs radially outside the stator 4*b*'. The electrical feed to the stator is effected by way of webs which are provided in the gap space of the inlet air opening.

Figure 3A:
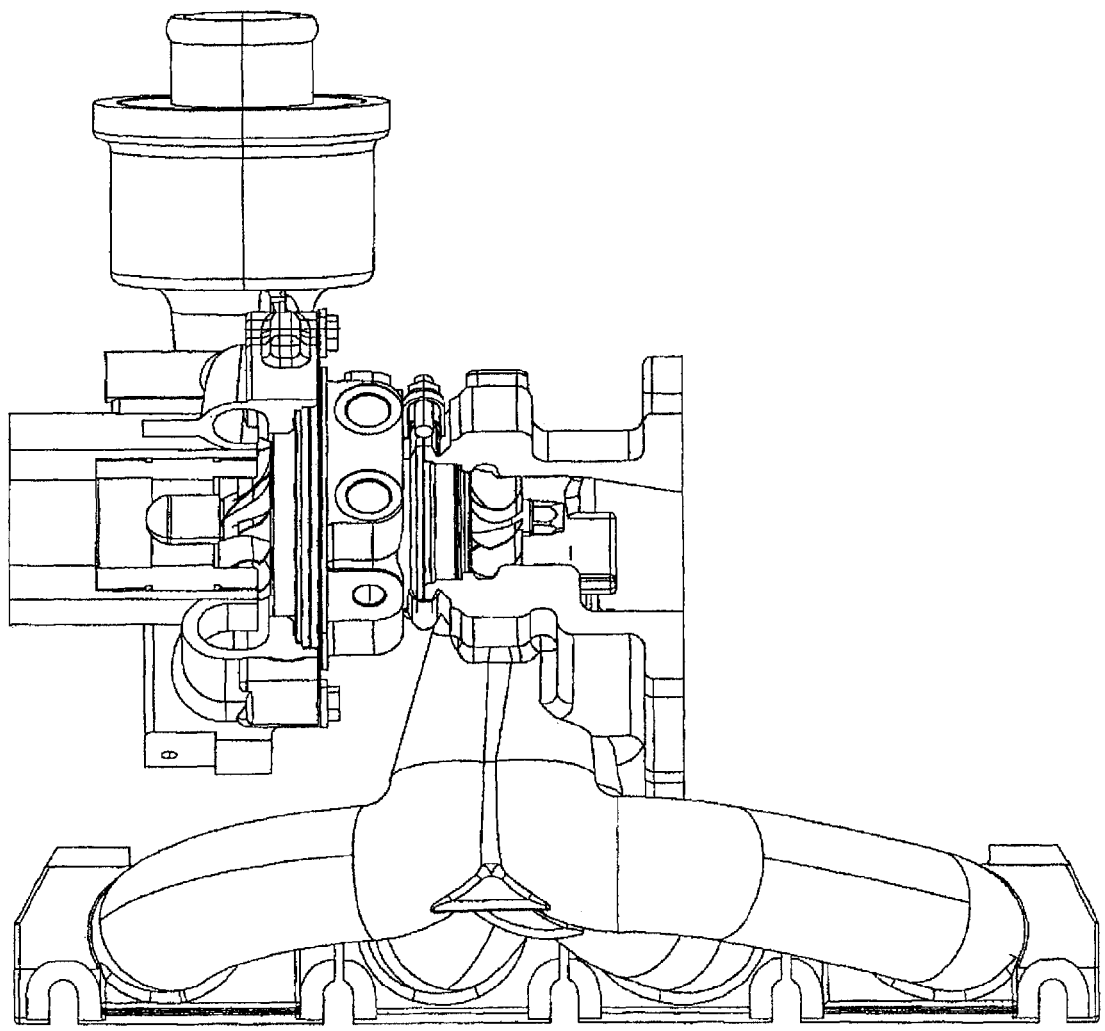
FIG. 3a shows a third exemplary embodiment of a turbocharger according to the present invention, in a part section.
Figure 3:
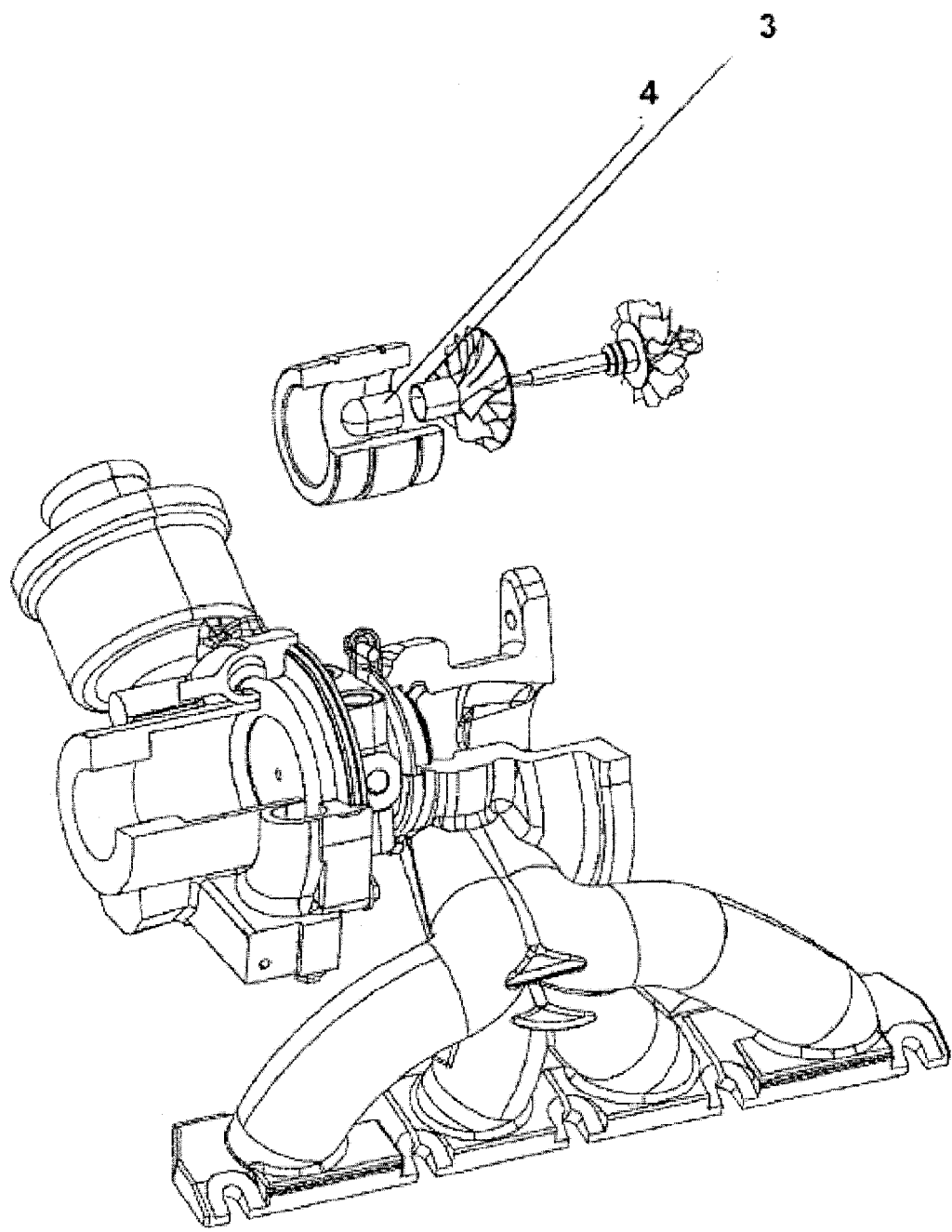
FIG. 3b shows a section of the turbocharger according to FIG. 3a in a section plane D.

A third embodiment is shown in the FIGS. 3*a* and 3*b*. Here, the rotor magnet 4 has been partially integrated into the compressor wheel 3 on manufacture. The stator forms the inner contour of the compressor housing. It has a Hall-probe, with whose help the rotor rotational speed may be continuously determined.

The electric motor may be operated in motor operation (for accelerating and avoiding a "turbolag") as well as in generator operation (for recovering energy). If the charging pressure (in the turbine housing) reaches a certain nominal value, then additional energy is produced by way of using a converter capable of return feed. Ideally, one may do away with a wastegate/pressure dos for blowing out excess exhaust gas pressure, as is represented in FIG. 1*b*, numeral 9, by way of this energetic conversion of the braking energy in generator operation.

What is claimed is:
1. A turbocharger, comprising:
a turbine wheel;
a compressor wheel connected to the turbine wheel;

an electric motor situated on a side of the compressor wheel which is distant to the turbine wheel; and
a rotor connected to the compressor wheel in a rotationally fixed manner and designed in a freely projecting manner,
wherein the electric motor includes a stator, the stator being a substantially a hollow-cylindrical shape,
wherein a rotor gap between the rotor and the stator represents an inlet air opening for the compressor wheel,
wherein a smallest inner diameter of the stator is 1.5 to 8 times as large as a largest outer diameter of the rotor, and
wherein the inlet air opening is the only air feed opening.

2. A turbocharger according to claim 1, wherein the turbine wheel and the compressor wheel are permanently connected to one another in a rotational fixed manner.

3. A turbocharger according to claim 1, further comprising:
a housing including a turbine housing for the turbine wheel and a compressor housing for the compressor wheel.

4. A turbocharger according to claim 1, wherein the mounting of the turbine wheel and the compressor wheel is given exclusively in a region between the turbine wheel and the compressor wheel.

5. A turbocharger according to claim 3, further comprising:
a bearing housing situated between the turbine housing and the compressor housing, the bearing housing receiving bearing elements for the turbine wheel and the compressor wheel.

6. A turbocharger according to claim 1, wherein a rotor of the electric motor comprises a rotor magnet which is surrounded by an sheathing.

7. A turbocharger according to claim 1, wherein the stator is designed as a part of an inner wall of the compressor housing.

8. A turbocharger according to claim 1, wherein the stator is inserted as an insert into a corresponding opening of the compressor housing.

9. A turbocharger according to claim 1, wherein the inlet air opening is free of struts between the rotor and the stator.

10. A turbocharger according to claim 1, wherein a smallest inner diameter of the stator is 2 to 4 times as large as a largest outer diameter of the rotor.

11. A turbocharger according to claim 6, wherein the sheathing of the rotor has a cylinder-shaped manner.

12. A turbocharger according to claim 6, wherein the rotor magnet on the inside is hollow in regions, for placing onto a common shaft with the compressor wheel.

13. A turbocharger according to claim 6, wherein the rotor magnet is integrated partially into the compressor wheel.

14. A turbocharger according to claim 6, wherein the rotor magnet is completely integrated into the compressor wheel.

15. A turbocharger according to claim 1, wherein the compressor wheel is composed of a non-metallic material.

16. A turbocharger according to claim 15, wherein the non-metallic material is one of a reinforced plastic and a non-reinforced plastic.

17. A turbocharger according to claim 2, wherein the turbine housing is connected to an exhaust gas conduit of an internal combustion engine for the drive of the turbine wheel using exhaust gas flowing out of the internal combustion engine.

18. A turbocharger according to claim 1, wherein the electric motor is switched from motor operation into a generator operation.

19. A turbocharger according to claim 1, wherein a nominal voltage of the electric motor is one of 12, 24 and 48 V.

20. A drive system for a motor vehicle, comprising:
an internal combustion engine;
a storage device storing electrical energy;
a turbocharger including (a) a turbine wheel; (b) a compressor wheel connected to the turbine wheel; (c) an electric motor situated on a side of the compressor wheel which is distant to the turbine wheel; and (d) a rotor connected to the compressor wheel in a rotationally fixed manner and designed in a freely projecting manner,
wherein the electric motor of the turbocharger is connected to the storage device for taking the electrical energy in a motor operation of the turbocharger and for feeding the electrical energy in a generator operation of the turbocharger,
wherein the electric motor includes a stator, the stator being a substantially a hollow-cylindrical shape,
wherein a rotor gap between the rotor and the stator represents an inlet air opening for the compressor wheel,
wherein a smallest inner diameter of the stator is 1.5 to 8 times as large as a largest outer diameter of the rotor, and
wherein the inlet air opening is the only air feed opening.

21. A drive system according to claim 20, wherein the electrical storage device connected to the electric motor of the turbocharger is further connected to an electromotoric drive of a motor vehicle.

22. A drive system according to claim 20, further comprising:
an arrangement determining (a) a rotational speed of one of the turbine wheel and the compressor wheel, (b) actual values of pressure conditions on the turbine housing side and compressor housing side, and (c) further values relevant to a torque for the internal combustion engine, wherein the arrangement includes one of control electronics and a sensor.

23. A turbocharger according to claim 1, wherein the compressor wheel is situated between the rotor and a combustion space of an engine.

24. A drive system according to claim 20, wherein the compressor wheel is situated between the rotor and a combustion space of an engine.

25. A turbocharger according to claim 1, wherein the smallest inner diameter of the stator and the largest outer diameter of the rotor relate to a region of the rotor and the stator which is one of electrically and magnetically active.

* * * * *